US009639904B2

(12) United States Patent
Idrees et al.

(10) Patent No.: US 9,639,904 B2
(45) Date of Patent: May 2, 2017

(54) SYSTEMS AND METHODS FOR MINIMIZING ENERGY COSTS FOR A POWER CONSUMPTION SYSTEM THAT HAS ACCESS TO OFF-GRID RESOURCES

(71) Applicant: OPTERRA ENERGY SERVICES, INC., Los Angeles, CA (US)

(72) Inventors: Osama Mohammed Idrees, San Jose, CA (US); David Sterling Potter, San Francisco, CA (US); Eduardo Alberto Alegria, San Mateo, CA (US)

(73) Assignee: OPTERRA ENERGY SERVICES, INC., Overland Park, KS (US)

( * ) Notice: Subject to any disclaimer, the term of this patent is extended or adjusted under 35 U.S.C. 154(b) by 993 days.

(21) Appl. No.: 13/836,253

(22) Filed: Mar. 15, 2013

(65) Prior Publication Data

US 2014/0163756 A1 Jun. 12, 2014

Related U.S. Application Data

(60) Provisional application No. 61/735,776, filed on Dec. 11, 2012.

(51) Int. Cl.
*G06Q 50/06* (2012.01)
*H02J 3/00* (2006.01)
(Continued)

(52) U.S. Cl.
CPC ............... *G06Q 50/06* (2013.01); *H02J 3/32* (2013.01); *H02J 3/381* (2013.01); *H02J 2003/003* (2013.01); *Y04S 10/54* (2013.01)

(58) Field of Classification Search
CPC .. G06Q 50/06; H02J 3/32; H02J 3/381; H02J 2003/003; Y04S 10/54
See application file for complete search history.

(56) References Cited

U.S. PATENT DOCUMENTS

| | | | |
|---|---|---|---|
| 8,019,697 B2 * | 9/2011 | Ozog | G06Q 10/06315 705/400 |
| 8,751,054 B2 * | 6/2014 | Wang | H02J 3/28 700/276 |

(Continued)

FOREIGN PATENT DOCUMENTS

| | | | |
|---|---|---|---|
| CH | EP 2190097 A1 * | 5/2010 | ............... H02J 3/32 |
| DE | 10 2012 202465 A1 | 8/2012 | |

(Continued)

*Primary Examiner* — Robert Fennema
*Assistant Examiner* — Jennifer L Norton
(74) *Attorney, Agent, or Firm* — Bryan Cave LLP

(57) ABSTRACT

A method includes: calculating a load prediction arising from an power consumption entity over a prospective time period; calculating a predicted off-grid power supply from an off-grid power supply; minimizing, for a respective time interval, a calculated amount of electrical-power to import from a power grid, in accordance with output from a cost function; and, for at least one interval, importing, from the power grid, the corresponding calculated amount of electrical-power corresponding to the at least one interval. The cost function uses: (i) a multi-component time of use tariff schedule associated with the power grid that includes a first power rate during a prospective time period and second power rate during a second time period, (ii) the load prediction over the prospective time period, (iii) the predicted off-grid electrical-power supply over the prospective time period, (iv) a state of a rechargeable battery.

33 Claims, 8 Drawing Sheets

(51) Int. Cl.
*H02J 3/32* (2006.01)
*H02J 3/38* (2006.01)

(56) References Cited

U.S. PATENT DOCUMENTS

| | | | |
|---|---|---|---|
| 9,124,138 B2 * | 9/2015 | Mori | H02J 3/34 |
| 9,252,599 B2 * | 2/2016 | Park | H02J 3/383 |
| 9,559,520 B2 * | 1/2017 | Shelton | H02J 3/381 |
| 2006/0276938 A1 * | 12/2006 | Miller | G06Q 50/06 |
| | | | 700/295 |
| 2008/0114499 A1 * | 5/2008 | Hakim | H02J 3/32 |
| | | | 700/291 |
| 2009/0319090 A1 * | 12/2009 | Dillon | G06Q 10/04 |
| | | | 700/291 |
| 2010/0179704 A1 | 7/2010 | Ozog | |
| 2011/0054642 A1 * | 3/2011 | Bondar | G05B 15/02 |
| | | | 700/29 |
| 2011/0125337 A1 * | 5/2011 | Zavadsky | G06F 1/263 |
| | | | 700/291 |
| 2012/0229077 A1 | 9/2012 | Tsuchiya | |
| 2014/0172182 A1 * | 6/2014 | Subbotin | H02J 3/383 |
| | | | 700/291 |
| 2014/0278692 A1 * | 9/2014 | Marwah | G06Q 10/06312 |
| | | | 705/7.22 |
| 2017/0003700 A1 * | 1/2017 | Pavlovski | G06Q 50/06 |
| 2017/0070084 A1 * | 3/2017 | Matsumoto | H02J 7/35 |

FOREIGN PATENT DOCUMENTS

| | | | | |
|---|---|---|---|---|
| EP | 2485356 A1 * | 8/2012 | | H02J 3/008 |
| EP | 2 509 180 A1 | 10/2012 | | |
| WO | 2008/058284 A2 | 5/2008 | | |

\* cited by examiner

518 — Minimize, for a respective time interval in a plurality of time intervals, a calculated amount of electrical-power to import from a power grid during the respective time interval, in accordance with output from a cost function.

520 — The plurality of time intervals collectively accounts for the prospective time period.

522 — The first time period is between 3 and 10 days and a respective time interval in the plurality of time intervals is between 30 minutes and 6 hours 524 — The multi-component tariff schedule includes a demand charge and an energy charge by the power grid, respectively, during (i) a peak-consumption time period, (ii) a partial-peak consumption time period, and (iii) an off-peak consumption time period.

526 — The cost function uses:
    (i) a multi-component tariff schedule that includes a first power rate during a first time period and second power rate during a second time period
    (ii) the load prediction over the prospective time period,
    (iii) the predicted off-grid electrical-power supply over the prospective time period, and
    (iv) a state of a rechargeable battery.

528 — The state of the rechargeable battery includes one of: a charge rate, a total capacity, a remaining capacity, and a type associated with the rechargeable battery.

SYSTEMS AND METHODS FOR MINIMIZING ENERGY COSTS FOR A POWER CONSUMPTION SYSTEM THAT HAS ACCESS TO OFF-GRID RESOURCES

PRIORITY AND RELATED APPLICATIONS

This application claims priority to U.S. Provisional Patent Application 61/735,776, file Dec. 11, 2012. This application also relates to U.S. Provisional Patent Application Nos. 61/735,788, and 61/735,801, each filed Dec. 11, 2012.

All the above-identified patent applications are hereby incorporated by references in their entireties.

TECHNICAL FIELD

The disclosed implementations relate generally to managing an integrated power system.

BACKGROUND

Budgeting utility costs can be difficult for several reasons. First, a utility provider may charge more per energy unit (e.g., per kilowatt hour) for electricity consumed when overall demand is high. For example, in desert areas, electricity may be twice as expensive during summer as during spring, due to an increased need to cool temperature down using weather conditioning systems. Second, a power consumer may not always benefit from inexpensive power supply even if it is available. For example, electricity produced by wind turbines, although inexpensive, cannot be fully taken advantage of without proper power equipments.

Moreover, under many tariff schedules, a both a load charge and an energy charge is levied. That is, the power consumer is charged for not only the amount of energy consumed, but also the rate at which it is consumed. Such a tariff schedule is designed to encourage constant rate power consumption. However, constant rate consumption is difficult to achieve in the face of a variable load demand. To add to the complexity, many tariff schedules charge separate load and energy charges for off-peak (standard), peak, and partial peak time intervals throughout the day. To further add to the complexity, many utility providers are moving towards real time pricing models which impose instantaneous load and energy charges based on real time energy production costs.

Thus, minimizing energy costs for the power consumer in the face of such complex tariff schedules represents a complex minimization problem, particularly when the power consumer can partially offset grid energy costs provided by the utility provider with off-grid renewable or partially renewable resources. The complex tariff schedules demand careful consideration of when and how such off-grid renewable or partially renewable resources are used to minimize the cost of power from the utility provider. In the face of such tariff schedules, the problem does not necessarily reduce to one in which the amount of power obtained from the power grid is minimized.

Given the above background, there is clearly a need in the art for systems and methods that can minimize costs incurred by grid power usage.

SUMMARY

The above identified difficulties are reduced or eliminated by the systems and methods disclosed herein. Systems, methods, devices, and non-transitory computer readable storage mediums for managing an integrated power system are disclosed herein.

In some implementations methods are performed by a computer system having one or more processors and memory storing one or more programs executed by the one or more processors. In such methods, a load prediction arising from an electrical-power consumption entity is calculated over a prospective time period (e.g., the next 24 hours). Also, a predicted off-grid electrical-power supply from an off-grid electrical-power supply is calculated over the prospective time period. For a respective time interval in a plurality of time intervals (e.g., 1 hour intervals), a calculated amount of electrical-power to import from a power grid during the respective time interval is minimized in accordance with output from a cost function. The cost function uses a multi-component time of use tariff schedule associated with the power grid that includes at least a first power rate during a prospective time period and second power rate during a second time period. The first power rate is other than the second power rate. The cost function also uses the load prediction and the predicted off-grid electrical-power supply over the prospective time period as well as a state of a rechargeable battery. The plurality of time intervals collectively accounts for the prospective time period. For at least one interval in the plurality of time intervals, the corresponding calculated amount of electrical-power corresponding to the at least one interval is imported from the power grid.

In some implementations, for a respective time interval in the plurality of time intervals, the cost function further uses an amount of off-grid electrical-power produced by the off-grid electrical-power supply during a historical time period. An example of a historical time period is the past five days.

In some implementations, for a respective time interval in the plurality of time intervals, the cost function further uses an integration or average of the actual load from the electrical-power consumption entity across a reference time interval.

In some implementations, the reference time interval occurs on the same day as the prospective time period. For instance, in some embodiments the prospective time period is a current 24 hour period (current day), and the reference time interval is the past hour.

In some implementations, for a respective time interval in the plurality of time intervals, the cost function further uses an integration or average of the actual off-grid electrical-power supply generated during a reference interval.

In some implementations, the reference time interval occurs on the same day as the prospective time period.

In some implementations, calculating the predicted off-grid electrical-power supply from the off-grid electrical-power supply over the prospective time period uses a weather report for the prospective time period. For instance, in some embodiments, the off-grid electrical-power supply includes a photovoltaic component and indications of inclement weather in the weather report are used to downgrade expected contributions from the photovoltaic component.

In some implementations, the cost function provides the calculated amount of electrical-power to import from a power grid during the respective time interval as an instantaneous value across the respective time interval. In some embodiments, this instantaneous value can be averaged across the respective time interval to arrive at the desired minimized value for the next time interval in the plurality of time intervals.

In some implementations, the cost function further uses instantaneous current load from the electrical-power consumption entity across the respective time interval.

In some implementations, the method also includes storing at least a portion of an off-grid electrical-power supply produced by the off-grid electrical-power supply in the rechargeable battery. It will be appreciated that, in many instances, the rechargeable battery is a multi-component, multi-cell rechargeable battery and that there may be more than one batter.

In some implementations, the multi-component time of use tariff schedule includes a load charge and an energy charge by the power grid, respectively, during (i) a peak-consumption time period, (ii) a partial-peak consumption time period, and (iii) an off-peak consumption time period.

In some implementations, the prospective time period is between 3 and 10 days and a respective time interval in the plurality of time intervals is between 30 minutes and 6 hours.

In some implementations, the off-grid electrical-power supply includes a renewable energy supply.

In some implementations, the off-grid electrical-power supply is affected by, at least in part, one or more natural events that are uncontrollable by a user.

In some implementations, the off-grid electrical-power supply includes power supply from one of: a photovoltaic power source, a fuel cell power source, a hydro-electric power source, a geo-thermal power source, a wind turbine, a diesel generator, or an albedo source.

In some implementations, the off-grid electrical-power supply includes power supply from two or more of: a photovoltaic power source, a fuel cell power source, a hydro-electric power source, a geo-thermal power source, a wind turbine, a diesel generator, or an albedo source.

In some implementations, the state of the rechargeable battery includes one of: a charge rate, a total capacity, a remaining capacity, and a type associated with the rechargeable battery.

In some implementations, the off-grid electrical-power supply over the prospective time period is predicated using: (i) availability of the off-grid electrical-power supply over the prospective time period, (ii) stability of the off-grid electrical-power supply over the prospective time period, and (iii) likelihood of a natural event affecting the off-grid electrical-power supply over the prospective time period. In some implementations, the off-grid electrical-power supply includes a photovoltaic apparatus and the natural event is time of year or time of day. In some implementations, the off-grid electrical-power supply includes a photovoltaic apparatus and the natural event is inclement weather.

In some implementations, the off-grid electrical-power supply over the prospective time period is further predicated based upon an amount of energy produced by all or a component of the off-grid electrical-power supply during a historical time period.

In some implementations, the off-grid electrical-power supply includes a fuel cell and the cost function further uses a rate of change in power production by the fuel cell during a reference period. This is useful in instances where the fuel cell has been reset and is ramping up after some period of down time.

In some implementations, the method also includes black-starting an isolated power system using electrical power stored in the rechargeable battery.

In some implementations, the method also includes storing electrical-power in the rechargeable battery or releasing electrical-power from the rechargeable battery in response to a predefined change of load from the electrical-power consumption entity.

In some implementations, the rechargeable battery is configured for storing more than 1 megawatt-hour of power. In some implementations, the rechargeable battery is a lithium iron phosphate battery.

In some implementations, the load prediction uses a weather report for the prospective time period.

In some implementations, the electrical-power consumption entity is an individual residence.

In some implementations, the electrical-power consumption entity is a town, building, city, a compound, a school, a university campus, a penitentiary, or a jail.

In some implementations, the multi-component time of use tariff schedule is based on a real time pricing model.

In some implementations, the off-grid electrical-power supply includes one or more generators and the method includes storing electrical power in the rechargeable battery without reducing power production from the one or more generators when supply exceeds load.

A second aspect of the present disclosure provides a computer system including one or more processors, memory, and one or more programs. The one or more programs are stored in the memory and are configured to be executed by the one or more processors. The one or more programs include instructions for calculating a load prediction arising from an electrical-power consumption entity over a prospective time period. The one or more programs further include instructions for calculating a predicted off-grid electrical-power supply from an off-grid electrical-power supply over the prospective time period. The one or more programs further include instructions for minimizing, for a respective time interval in a plurality of time intervals, a calculated amount of electrical-power to import from a power grid during the respective time interval, in accordance with output from a cost function. The cost function uses a multi-component time of use tariff schedule associated with the power grid that includes a first power rate during a prospective time period and second power rate during a second time period. The first power rate is other than the second power rate. The cost function also uses the load prediction and the predicted off-grid electrical-power supply over the prospective time period as well as a state of a rechargeable battery. The plurality of time intervals collectively accounts for the prospective time period. For at least one interval in the plurality of time intervals, the corresponding calculated amount of electrical-power corresponding to the at least one interval is imported from the power grid.

A third aspect of the present disclosure provides a non-transitory computer readable storage medium storing one or more programs. The one or more programs comprise instructions for calculating a load prediction arising from an electrical-power consumption entity over a prospective time period. The one or more programs further comprise instructions for calculating a predicted off-grid electrical-power supply from an off-grid electrical-power supply over the prospective time period. The one or more programs further comprise instructions minimizing, for a respective time interval in a plurality of time intervals, a calculated amount of electrical-power to import from a power grid during the respective time interval, in accordance with output from a cost function. The cost function uses a multi-component time of use tariff schedule associated with the power grid that includes a first power rate during a prospective time period and second power rate during a second time period. The first power rate is other than the second power rate. The cost function also uses the load prediction and the predicted off-grid electrical-power supply over the prospective time period as well as a state of a rechargeable battery. The plurality of time intervals collectively accounts for the prospective time period. For at least one interval in the plurality of time intervals, the corresponding calculated amount of electrical-power corresponding to the at least one interval is imported from the power grid.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

FIGS. 5A-5C are flow charts illustrating a method for managing an integrated power system.

DETAILED DESCRIPTION

The implementations described herein provide techniques for managing an integrated power system.

In some implementations, energy pricing changes in real time: the same amount of electricity is more expensive when demand is high but less expensive when demand is low.

In some implementations, when cost per energy unit is low, e.g., during night time, from 1 AM to 5 AM, a computer system stores electrical power received from a power grid and stores the power in a large-scale rechargeable battery. In some implementations, when electricity supply from an off-grid source is also available, e.g., electricity produced by a wind turbine or a large number of solar panels, the computer system stores the electricity supply produced by the off-grid sources also in the large-scale rechargeable battery.

In some implementations, when cost per energy unit is high, e.g., during day time, from 8 AM to 10 PM, a computer system releases electrical power stored in the rechargeable battery for consumption by electrical devices (e.g., computer, home appliances, and air conditioning systems)

By these ways, energy imported from the power-grid, when cost per energy unit is high, is minimized and utility costs are kept low.

Additional details of implementations are now described in relation to the Figures.

Figure 1:
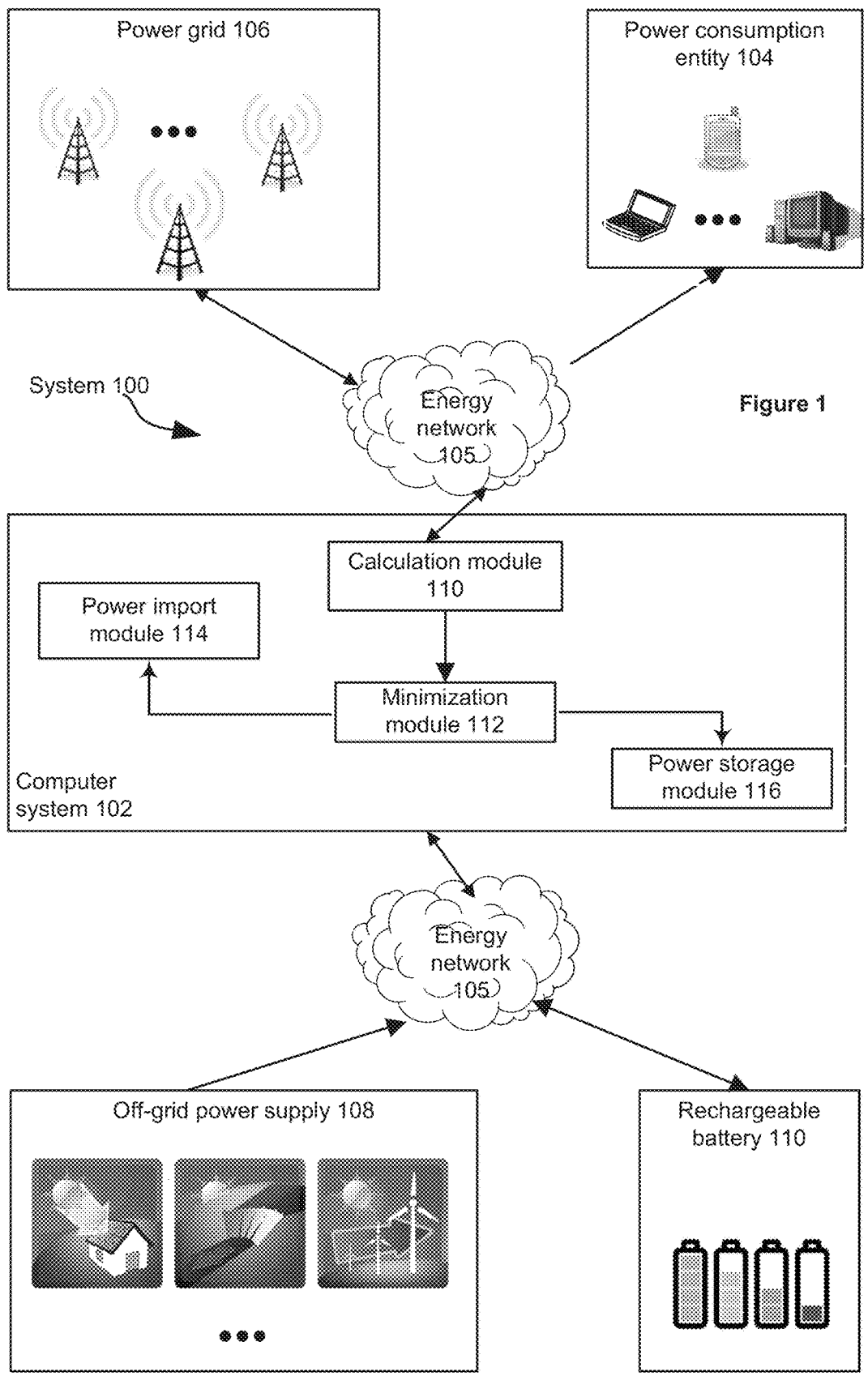
FIG. 1 is a block diagram illustrating a power system, in accordance with some implementations.

FIG. 1 is a block diagram illustrating a system 100 for managing an integrated power system. In some implementations, the system 100 includes a computer system 102, one or more power consumption entities 104, a power grid 106, an off-grid power supply 108, a rechargeable battery 110, and one or more energy networks 105 for interconnecting these components.

In some implementations, the computer system 102 includes a calculation module 110, a minimization module 112, a power import module 114, and a power storage module 116. In some implementations, the computer system 102 predicts power load from one or more power consumption entities 104, as well as potential power supply from the off-grid power supply 108. In some implementations, the computer system 102, based on the predicted supply and load, imports electrical power (e.g., electricity) from the power grid 106, when it is inexpensive to do so (e.g., when cost per kilowatt hour is low), such as during late night hours, and stores the imported electricity in the rechargeable battery 110.

In some implementations, the computer system 102, based on the predicted supply and load, also stores electrical-power generated by the off-grid power supply 108 (when it is available, e.g., a large amount of electricity are generated by wind turbines, due to a recent persistent high wind condition) in the rechargeable battery 110.

In some implementations, the computer system 102, based on the predicted supply and load, releases electrical-power (e.g., electricity) stored in the rechargeable battery 110 for consumption by the power consumption entities 104, when it is expensive to import electricity from the power grid 106 (e.g., when cost per kilowatt hour is high), such as during day time hours, thereby reducing energy cost.

In some implementations, the computer system 102 is a distributed energy resources management system (DERMS) that controls the operation of distributed energy resources (DERs)—e.g., the power grid 106, the off-grid power supply 108, and an advanced energy storage (AES), which includes the rechargeable battery 110. In some implementations, the computer system 102 operates to minimize utility cost, in accordance with supply, load, and time-of-use (TOU) billing factors. In some implementations, the computer system 102 predicts power supply and load to optimize the operation of distributed energy resource as well as that of the advanced energy storage.

In some implementations, the one or more power consumption entities 104 includes structures and equipments that consume power (e.g., electricity power), e.g., single-family houses, condominiums, city libraries, town halls, computers, heaters, air conditioners, home appliances, industrial equipments, lights, and automatic doors.

In some implementations, the power grid 106 provides electrical power supplied by a utility provider, such as the PG&E company, the California ISO company, the PJM Interconnection company, and the EDISON company.

In some implementations, the off-grid power supply 108 includes one or more power supplies other than the power grid, such as solar panels, photovoltaic, hydro-electric station, wind farm/turbines, geysers, biomass plants, and geothermal generators.

In some implementations, the rechargeable battery 110 includes a predefined number of individual batteries, e.g., a battery pool having 400 individual batteries, or a battery rack including 2,000 batteries. In some implementations, the rechargeable battery 110 is capable of providing 4 megawatt hours of electricity. In some implementations, the rechargeable battery is configured for storing more than 1 megawatt-hour of power. In some implementations, the rechargeable battery is a lithium iron phosphate battery.

In some implementations, an energy network 105 includes power lines, transmission towers, power switches, or a subset thereof, for electrical power transmission and storage. In some implementations, the energy network 105 optionally includes a computer network for transmitting control signals, e.g., between the computer system 102 and the power grid 106, or between the off-grid power supply 108 and the computer system 102. In some implementations, the energy network 105 includes the Internet, one or more local area networks (LANs), one or more wide area networks (WANs), other types of networks, or a combination of such networks.

Figure 2:
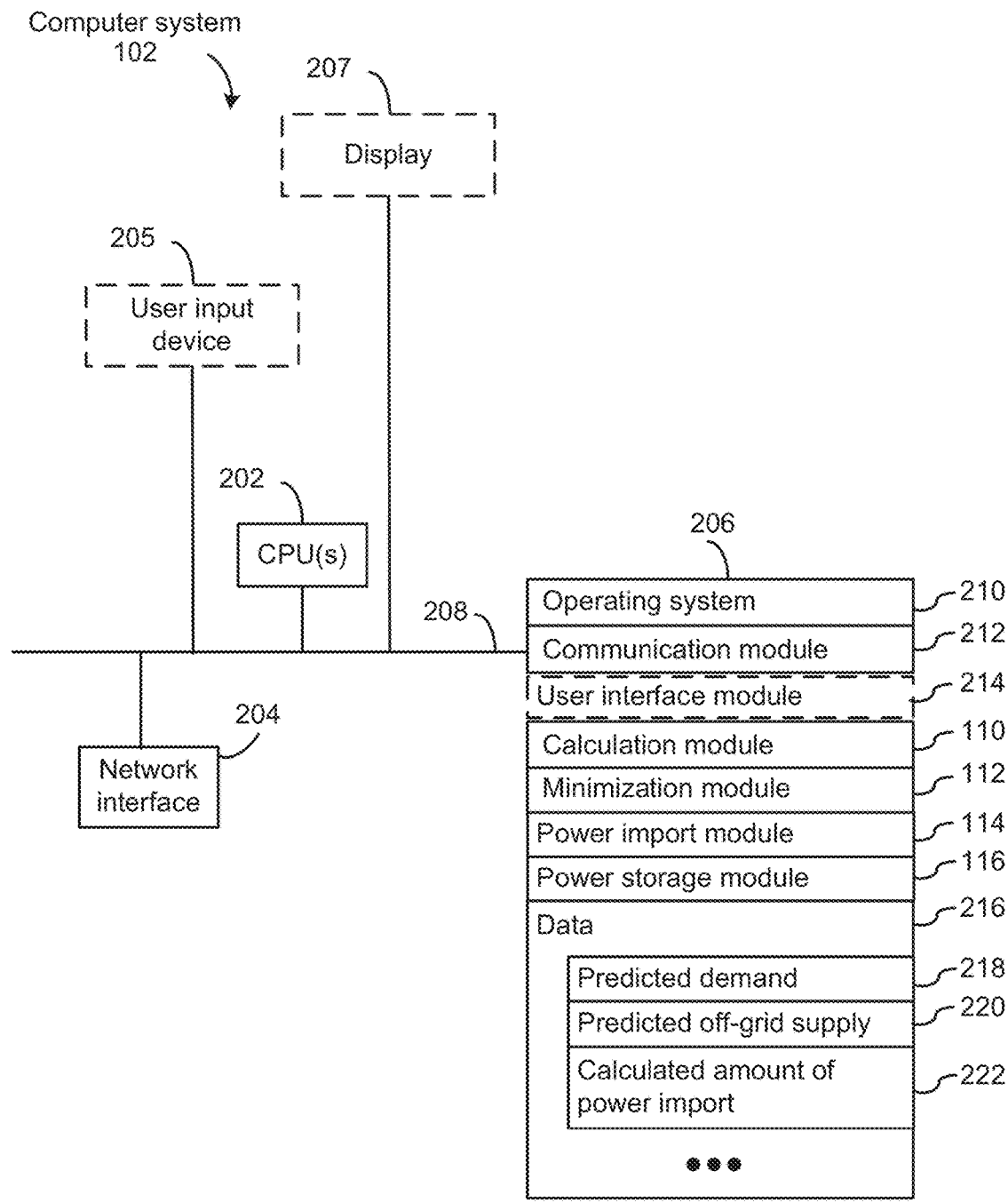
FIG. 2 is block diagram illustrating example configurations of a computer system, in accordance with some implementations.

FIG. 2 is block diagram illustrating example configurations of a computer system 102 for managing an integrated power system, in accordance with some implementations.

The computer system 102, in some implementations, includes one or more processing units CPU(s) 202 (also herein referred to as processors, one or more network interfaces 204, one or more user input devices 205, memory 206, a display 207, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

- an operating system 210, which includes procedures for handling various basic system services and for performing hardware dependent tasks;
- a network communication module (or instructions) 212 for connecting the computer system 102 with other components in the system 100 (e.g., a computing device controlling the power grid 106 or an electrical power switch to turn on/off power supply from the off-grid power supply 108) via one or more network interfaces 204 (wired or wireless), or the energy network 105 (FIG. 1);
- optionally, a user interface module 214 for displaying different user interface control, for obtaining user input, and for generating control signals in accordance therewith;
- a calculation module 110 for predicting power supply from the off-grid power supply 108 over a predefined time period (e.g., a prospective or future time period), for predicting a load from one or more power consumption entities 104 over the same predefined (e.g., prospective) time period;
- a minimization module 112 for minimizing power import from the power grid 108, in accordance with data received from the calculation module 110 as well as a state of the rechargeable battery 110;
- a power import module 114 for determining information relating to importing electrical-power from the power grid 106 (e.g., an amount of electricity to be imported, a timing thereof, a manner thereof, and subsequent storage thereof);
- a power storage module 114 for determining information relating to storing electrical-power into or releasing electrical-power from the rechargeable battery 110 (e.g., an amount of power to be stored in the battery, a timing thereof, a manner thereof, and subsequent transmission thereof, e.g., to which power consumption entity electricity is transmitted); and
- data 216 stored on the computer system 102, which include:
  - a predicted demand (load) 218, which represents an estimated or predicted amount of energy, e.g., electricity, one or more power consumption entities are to consume, during a particular prospective time period (e.g., the next week or three hours from the current time);
  - a predicted off-grid supply 220, which represents an estimated or predicted amount of energy, e.g., electricity, an off-grid power supply is to provide, during a different or the same prospective time period (e.g., how many megawatt hours electricity a wind turbine at downtown "Windy City"—Chicago—will produce, during the next week or during the next 6 hours); and
  - a calculated amount of power import 222, which represents an estimated or predicted amount of energy, e.g., electricity, to be imported, during a different or the same prospective time period from the power grid 106.

In some implementations, the one or more user input devices 205 include a microphone (e.g., for voice control), a keyboard, a mouse, a touchscreen, and/or a trackpad. In some implementations, the display 207 includes a computer monitor and, optionally, a touchscreen.

The computer system 102, in some implementations, is implemented at a desktop computer. In other implementations, the computer system 102 is implemented at a mobile computing device, e.g., a smartphone, an APPLE IPAD or IPHONE, a hand-held device, such as a field testing device.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
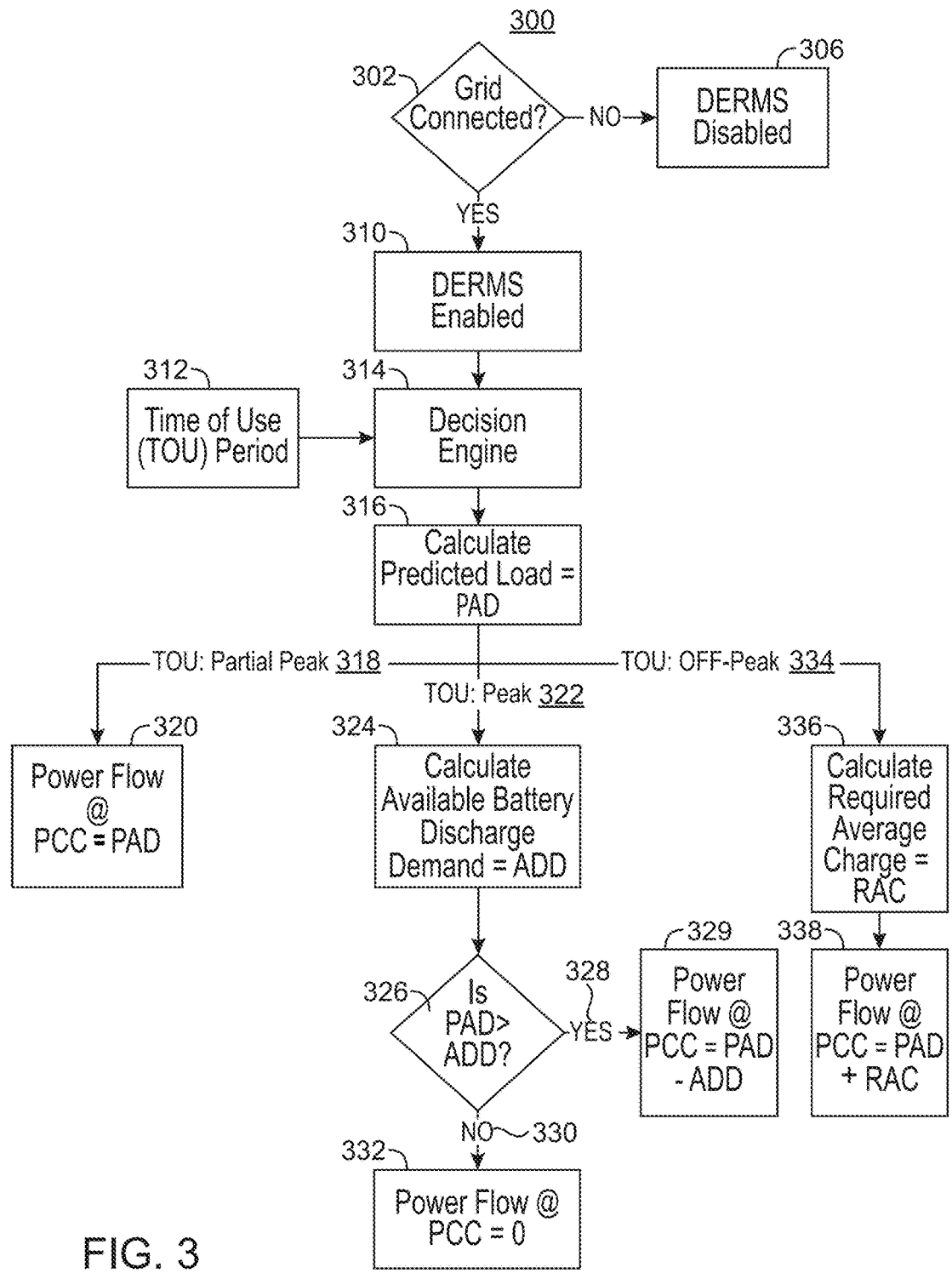
FIG. 3 is a flow chart illustrating a method for managing an integrated power system.

FIG. 3 is a flow chart illustrating a method 300 for managing an integrated power system, e.g., implemented at the computer system 102, in accordance with some implementations.

In some implementations, the computer system first determines it is connected (302) with a power grid (e.g., the power grid 106) or a control device thereof (e.g., a switch that control power supply from the power grid).

In some implementations, if the computer system is not connected with a power grid (302—No), and the computer system (sometime also called the DERMS system) is disabled (306).

In some implementations, if the computer system is connected with a power grid (302—Yes), the computer system (e.g., the DERMS system) is enabled (310).

In some implementations, after being enabled, the computer system calculates a predicted load (316) from one or more power consumption entities, e.g., a residential area or a school. In some implementations, to calculate the predicted load a time of use (TOU) period (312) is inputted into a decision engine (314).

In some implementations, during a partial peak consumption period 318 (e.g., when power demand is at a medium level, such as from 5 PM to 11 PM, during work days), computer system imports as much electricity from a power grid as the predicted load (320), e.g., because it is relatively inexpensive to do so.

In some implementations, during a peak consumption period 322 (e.g., when power demand is at a high level, such as from 9 AM to 5 PM, during work days), computer system 102 first determines (324) how much electricity a rechargeable battery can provide. When the rechargeable battery (e.g., after a long and successful charging period) can provide more electricity than the predicted load (e.g., when "PAD>ADD" 326 is "No" 330), the computer system releases electricity from the battery to meet the predict load/demand, without importing electricity from the power grid (as indicated by "Power Flow @ PCC =0" 332), especially when it is expensive to do so, thereby reducing energy cost.

In some implementations, when, however, the rechargeable battery (e.g., after a long and successful charging period) cannot provide all the electricity as required by the predicted load (e.g., when "PAD>ADD" 326 is "Yes" 328), the computer system releases electricity from the battery (e.g., as much as possible) to meet the predict load/demand, and to meet the remaining load/demand, the computer system imports (329) an amount of electricity (e.g., the different between the predicted load and the amount of electricity the batter can provide, as indicated by "Power Flow @ PCC =PAD –ADD" 329) from the power grid, even though it is expensive to do so, e.g., because it may be also necessary to do so, e.g., when a jail needs electricity to power its perimeter fence, even during a time when the electricity is expensive.

In some implementations, during an off-peak consumption period 334 (e.g., when power demand is at a low level, such as from 12 AM to 5 AM, during work days), computer system 102 determines (336) how much electricity (sometimes also called a required average charge, RAC) can be stored (e.g., charged) into a rechargeable battery, imports electricity from a power grid, and then stores the electricity into the rechargeable battery (338) (when it is inexpensive to do so). In some implementations, as noted above, the electricity stored in the battery is then release during to peak time period to meet load/demand.

Figure 4:
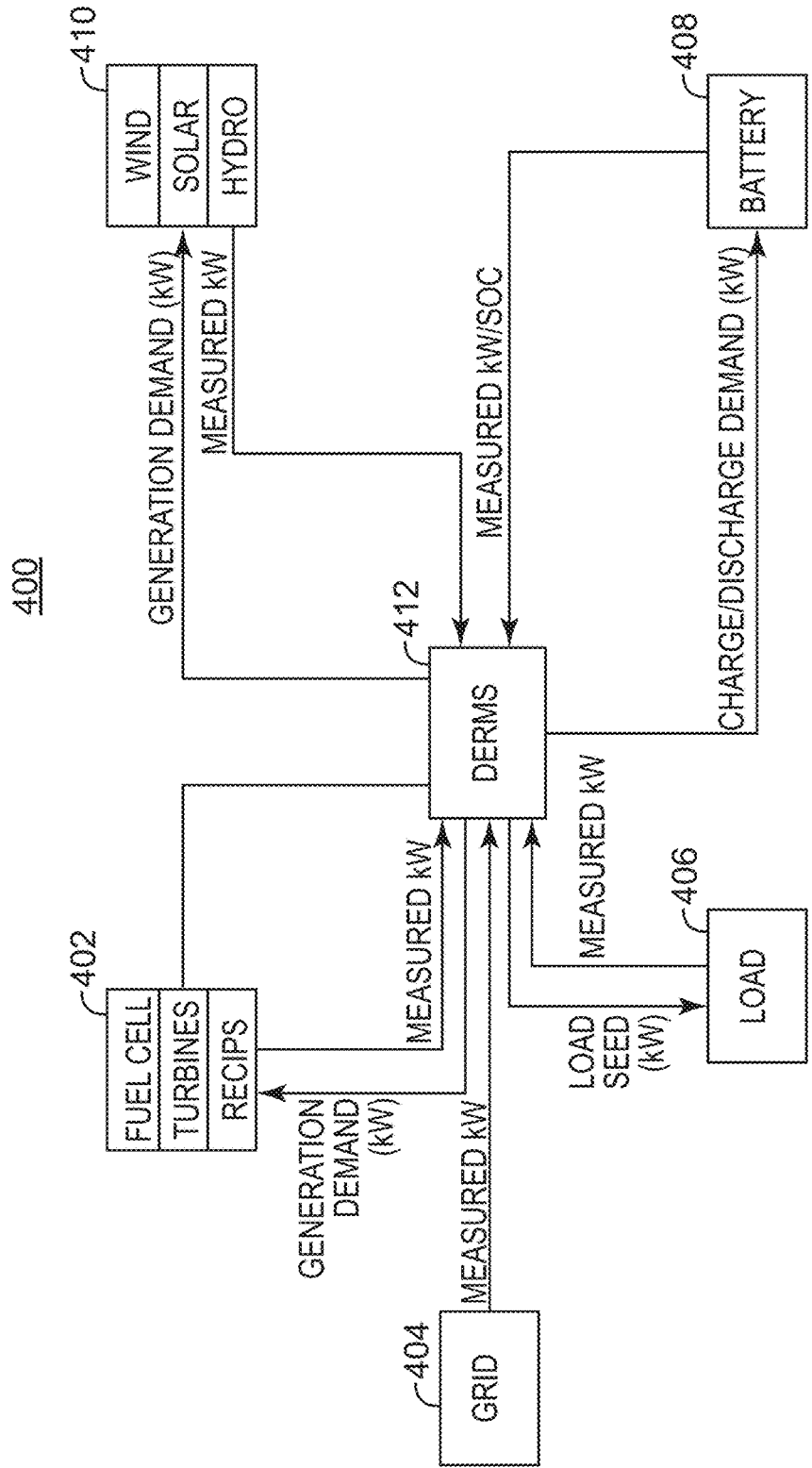
FIG. 4 is a diagram illustrating an integrated power system, in accordance with some implementations.

FIG. 4 is a diagram illustrating an integrated power system 400, in accordance with some implementations.

As shown in FIG. 4, the integrated power system 400 includes a DERMS (distributed energy resources management system) 412, a power grid 404, two off-grid power supplies 402 and 410, which include fuel cell, and turbines, as well as wind, solar, and hydro electricity supplies, a power load entity 406, and a battery 408.

As shown in FIG. 4, in some implementations, the DERMS measures or predicts a load by the power load entity 406 (e.g., a jail) in the amount of kilowatt hours. The DERMS also calculates or predicts a supply by the power grid 404 (e.g., a PG & E power grid), also in the amount of kilowatt hours. The DERMS further calculates or predicts a supply by the two off-grid power supplies 402 and 410.

As shown in FIG. 4, when the predicted supply by the two off-grid power supplies 402 and 410 exceeds the predicted load by the load 406, electricity generated by the off-grid power supplies 402 and 410 are stored in the battery 408, e.g., so as to conserve electricity, and to user these electricity when it is expensive to import electricity from the grid 404.

As shown in FIG. 4, when the predicted supply by the two off-grid power supplies 402 and 410 cannot meet, at least partially, the predicted load by the load 406, electricity stored in the battery 408 is first released to meeting the predicted load, e.g., when it is expensive to import electricity from the grid 404.

Figure 5A:
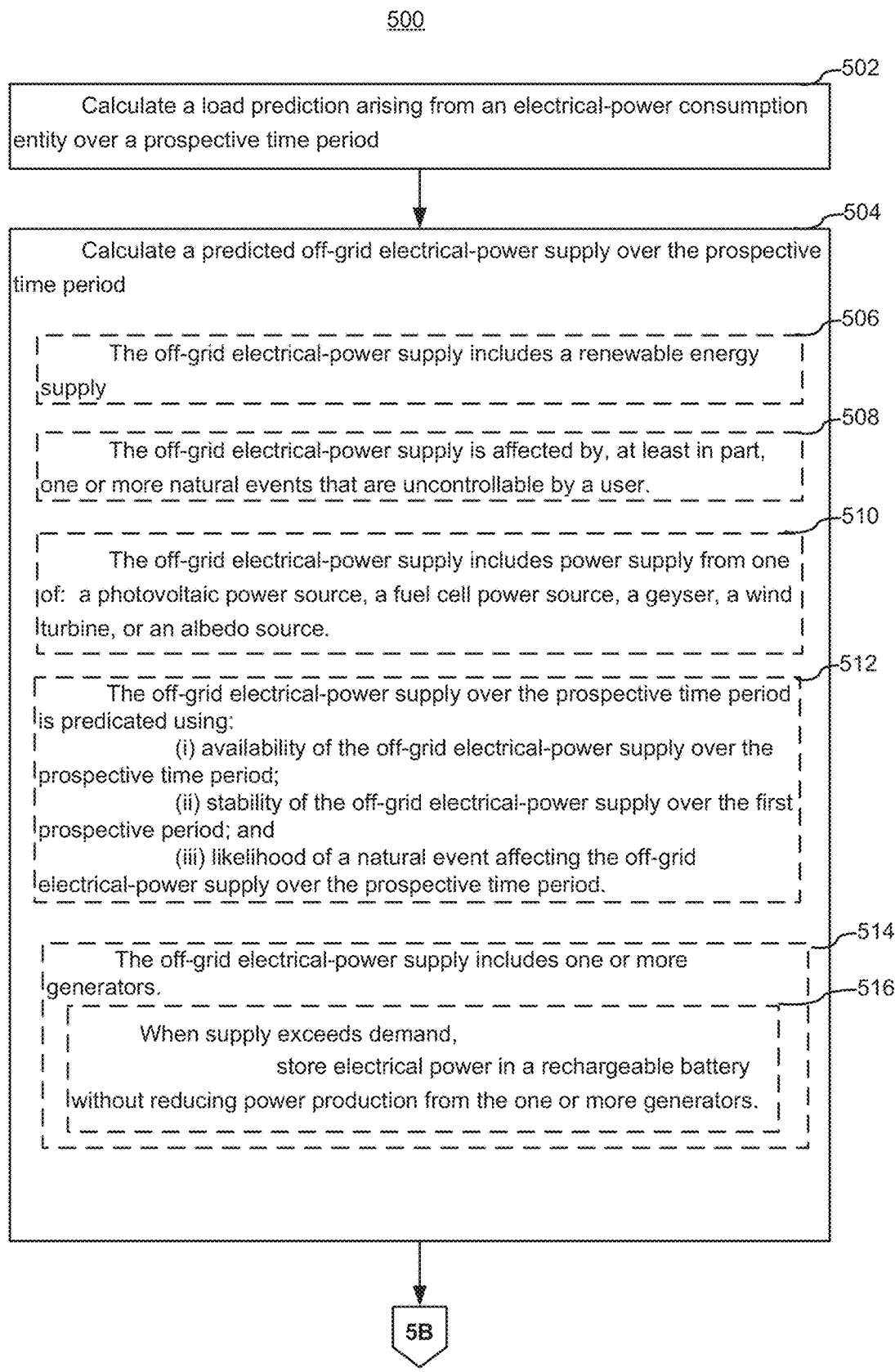
Figure 5C:
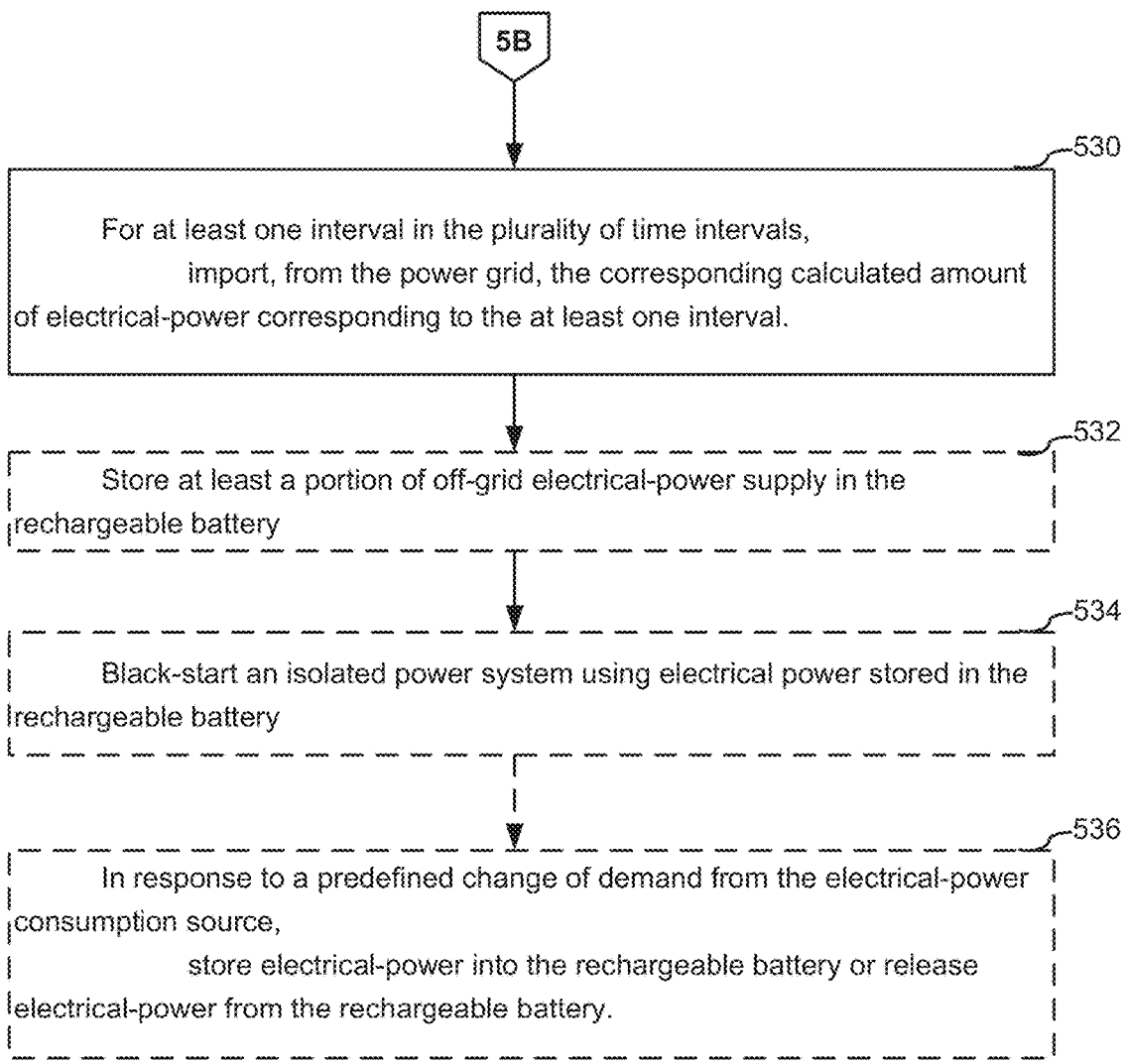

FIGS. 5A-5C are flow charts illustrating a method 500 for managing an integrated power system, e.g., implemented at the computer system 102, in accordance with some implementations.

In some implementations, the computer system 102 first calculates (502) a load prediction arising from an electrical-power consumption entity over a prospective time period, e.g., next 24 hours. For example, the computer system 102 calculates, estimates, or predicts how much kilowatt-hours of electricity a detention facility, a restaurant, a residential area, a city, or a county is going to consume, during the summer season of 2015. In some implementations, the electrical-power consumption entity is a town, building, city, a compound, a school, a university campus, a penitentiary, or a jail. In some implementations, the electrical-power consumption entity is an individual residence, e.g., a single family home. In some implementations, the load prediction uses a weather report for the prospective time period, e.g., a CNN weather report stating that tomorrow will be windy and rainy.

In some implementations, the prospective time period is a time period within a predefined time interval (e.g., one hour, one day, a week, or a month) from current date or time, e.g., so as to provide a more accurate estimation or prediction. In some implementations, the prospective time period is between 3 and 10 days from the current date or time. Because, in some situations, a prediction of power load (e.g. consumption) for a near future is more likely to be reliable than that for a remote time period (e.g., 10 years from now), e.g., due to technological advances and changes in energy usage patterns.

In some implementations, the computer system 102 also calculates (504) a predicted off-grid electrical power supply over the prospective time period. For example, the computer system calculates, estimates, or predicts how many kilowatt-hours of electricity a wind farm (e.g., a group of wind turbines), a hydro-electric station, a photovoltaic system, or a subset or combination thereof, will likely produce over the prospective time period (e.g., 4 days from the current date, or an hour from the current time).

In some implementations, the off-grid electrical-power supply over the prospective time period is further predicated based upon an amount of energy produced by all or a component of the off-grid electrical-power supply during a historical time period. For example, when the off-grid electrical-power supply includes a fuel cell, energy production by the fuel cell during the last summer season is used to predict energy production by the same fuel cell during the upcoming summer season.

In some implementations, the off-grid electrical-power supply over the prospective time period is predicated (512) using: (i) availability of the off-grid electrical-power supply over the prospective time period; (ii) stability (e.g., reliability) of the off-grid electrical-power supply over the prospective time period; and (iii) likelihood of a natural event affecting the off-grid electrical-power supply over the prospective time period.

For example, the amount of electricity an off-grid electrical-power supply produces or is likely to produce during a summer season is predicted based on operational time of a specific mode of wind turbine in use (e.g., a maximum number of hours a turbine can continuously operate without malfunctioning). For example, the amount of electricity a hydro-electric station is likely to produce during a rainy season is predicted based on an amount of daily, weekly, or monthly maintenance time (during which the hydro-electric is not operational) required for a hydro-electric generator. In still another example, the amount of electricity an off-grid electrical-power supply is likely to produce during the month of February is predicted based on how likely a newly-elected president will order a shutdown of nuclear stations that have been in service for longer than 10 year, when the off-grid electrical-power supply includes such a nuclear station.

In another example, the amount of electricity the off-grid electrical-power supply is likely to produce during the summer season is predicted also based on whether a particular wind farm or a turbine included therein is likely to malfunction during the summer season, e.g., how reliable the wind farm or the turbine is likely to be, when the off-grid electrical-power supply includes the particular wind farm or the turbine.

In still another example, the amount of electricity the off-grid electrical-power supply is likely to produce during the summer season is predicted also based on likelihood of a natural event affecting the off-grid electrical-power supply over the summer season, e.g., how likely the summer reason is a windy season based on a recent or an authoritative weather forecast, when the off-grid electrical-power supply includes a wind farm; or how probable the summer reason will be a rainy season, when the off-grid electrical-power supply includes a hydro-electric station. In some implementations, calculating the predicted off-grid electrical-power supply from the off-grid electrical-power supply over the prospective time period uses a weather report for the prospective time period.

In some implementations, the off-grid electrical-power supply over the prospective time period is predicated using: a likelihood of an event affecting the off-grid electrical-power supply over the prospective time period. In some implementations, an event affecting the off-grid electrical-power supply over the prospective time period includes, a scheduled maintenance, a downtime, an equipment replacement.

In some implementations, the off-grid electrical-power supply includes a renewable energy supply (506), e.g., so as to comply with relevant environmental regulations or to provide green or low carbon emission energy supply. In some implementations, the off-grid electrical-power supply includes power supply from one of: a photovoltaic power source, a fuel cell power source, a geyser, a wind turbine, a hydro-electric station, a nuclear power source, a geothermal power source, a fuel cell power source, a tidal power source, or an albedo power source (510). In some implementations, the off-grid electrical-power supply includes power supply from two or more of: a photovoltaic power source, a fuel cell power source, a hydro-electric power source, a geo-thermal power source, a wind turbine, a diesel generator, or an albedo source.

In some implementations, the off-grid electrical-power supply is affected by, at least in part, one or more natural events that are uncontrollable by a user (508). For example, because Chicago, Ill. ceases, at least temporarily, to be a windy city during summer seasons, a wind turbine farm constructed in the Chicago metro area may not produce as much energy as desired to suffice as a renewable energy supply. In some implementations, a natural event that are uncontrollable by a user includes an event that qualifies as force majeure, such as a war, a strike, a riot, a crime, a hurricane, a flooding, an earthquake, a volcanic eruption. In some implementations, the off-grid electrical-power supply includes a photovoltaic apparatus and the natural event is time of year or time of day. In some implementations, the off-grid electrical-power supply includes a photovoltaic apparatus and the natural event is inclement weather.

In some implementations, the off-grid electrical-power supply also includes a traditional (e.g., carbon) energy supply, such as a diesel or gasoline generator, a fossil fuel energy supply, because, in some cases, a traditional (e.g., carbon) energy supply is more readily available (e.g., during an emergency situation, or at a location where continuous power supply is paramount, such as at a county jail or a state prison) and less expensive to operate.

In some implementations, the off-grid electrical-power supply includes one or more generators (514), such as fossil fuel (e.g. coal), diesel, or gasoline generators, and when supply from the one or more generators exceeds load e.g., by the power consumption entity 104, the computer system 102 stores electrical power (e.g., the excessive power generated by the one or more generators) in a rechargeable battery without reducing power production from the one or more generators (516). These approaches are advantageous: Generators produce power more efficiently (e.g., producing the same amount of electricity but with less diesel), when working at full capacity (e.g., 100%) than working under less than full capacity (e.g., 50%).

In some implementations, the traditional (e.g., carbon) energy supply is implemented as a backup supply source to the renewable energy supply, during a time period when the renewable energy supply is not readily available, e.g., to replace power supply from a nuclear station when a moratorium on nuclear power generation becomes effective.

In some implementations, after calculating the predicted off-grid electrical-power supply over the prospective time period, the computer system minimizes, for a respective time interval in a plurality of time intervals, a calculated amount of electrical-power to import from a power grid during the respective time interval, in accordance with output from a cost function (518), e.g., so as to keep energy cost down. For example, after determining that predicted (electricity) load for tomorrow is 2 megawatt hours, but predicted supply for tomorrow by an off-grid power supply is only 0.5 megawatt hours, the computer system calculates an amount of electrical-power to import from a power grid during a particular timing or timeframe (e.g., which hour) for tomorrow. The plurality of time intervals collectively accounts for the prospective time period (520). Calculating electricity import during a specific time period or timeframe is important, because, in many cases, electricity is priced differently during different time periods—lower when demand/load is lower, e.g., during late evening hours, and higher when demand/load is higher, e.g., day time hours. In some implementations, the calculation uses output, or a portion thereof, from a cost function (518). Moreover, a premium is placed on consistent power rate consumption under many tariff schedules. Thus, a prospective determination of the amount of energy needed from a grid during a particular time interval is useful because the power can then be drawn from the power grid at a steady rate during the time interval in accordance with the estimate of the amount of energy needed from the grid during the particular time frame, thereby driving down energy costs.

In some implementations, the prospective time period is between 3 and 10 days and a respective time interval in the plurality of time intervals is between 30 minutes and 6 hours (522), e.g., so as to provide a more accurate prediction, because as noted above, predictions for near future are likely to be more accurate than those for remote future.

In some implementations, the cost function provides the calculated amount of electrical-power to import from a power grid during the respective time interval as an instantaneous value across the respective time interval. For example, after the cost function determines an amount of electricity to be import from a power grid, the computer system starts immediate or within a threshold amount of delay (e.g., 2 seconds later) begins to importing the amount of electricity from the power grid. These approaches allow for fast response time, thereby increase efficiency.

In some implementations, the cost function uses instantaneous current load from the electrical-power consumption entity across the respective time interval. For example, the cost function uses current load information (e.g., gather from the power grid or from the one or more consumption entities) to determine an amount of electricity to be import from a power grid. These approaches are advantageous, because predicting future load using current load is more likely to produce accurate results.

In some implementations, the cost function uses: (i) a multi-component tariff schedule, (ii) the predicted load over the prospective time period, (iii) the predicted off-grid electrical-power supply over the prospective time period, and (iv) a state of a rechargeable battery (526).

In some implementations, the multi-component tariff schedule includes a load charge and an energy charge by the power grid, respectively, during (i) a peak-consumption time period, (ii) a partial-peak consumption time period, and (iii) an off-peak consumption time period (524). In some implementations, the multi-component tariff schedule includes a table of electricity pricing information associated with different time period. For example, 9 AM to 5 PM every week day is considered a peak consumption time period (e.g., a commercial consumption period), electricity is priced at 10 dollars per kilowatt hour; 5 AM to 12 AM every week day is considered a partial peak consumption time period (e.g., a residential consumption period), electricity is priced at 5 dollars per kilowatt hour; and 12 AM to 9 PM every week day and all weekend are considered an off-peak consumption time period (e.g., both commercial and residential consumptions are low), electricity is thus priced at 1 dollar per kilowatt hour.

In some implementations, the multi-component time of use tariff schedule is based on a real time pricing model, for example, electricity price is determined at the same time as or within a predefine time interval from when the electricity was delivered to or consumed by a consumption entity, e.g., a consumer.

In some implementations, the state of the rechargeable battery includes one of: a charge rate, a total capacity, a remaining capacity, and a type associated with the rechargeable battery (528), e.g., how fast the rechargeable battery can be charged, an amount of electricity being stored in the battery, and a manufacturer or a module name of the battery.

In some implementations, for a respective time interval in the plurality of time intervals, the cost function further uses an integration or average of the actual load from the electrical-power consumption entity across a reference time interval. For example, actual power load/demand for one time period in the past (e.g., at 5 AM yesterday), or an average thereof, is used to predict power load/demand for a similar figure time period (e.g., at 5 AM tomorrow).

In some implementations, the reference time interval occurs on the same day as the prospective time period, for example, the reference time interval is from 8 AM-9 AM on Day 1, and while the prospective time period is from 5 PM to 6 PM on the Day 1 (when the current time is 12:43 PM on the Day 1).

In some implementations, for a respective time interval in the plurality of time intervals, the cost function further uses an amount of off-grid electrical-power produced by the off-grid electrical-power supply during a historical time period, so as to render a prediction or minimization more accurate and thus more effective. For example, power production data from two days ago by a wind farm are used to predict today's power production by the same wind farm.

In some implementations, for at least one interval in the plurality of time intervals, the computer system imports (530), from the power grid, the corresponding calculated amount of electrical-power corresponding to the at least one interval. For example, after determining that it is likely to be inexpensive to import electricity during a specific future time period, the computer system imports electricity accordingly from the power grid, so as to keep energy cost low.

In some implementations, the off-grid electrical-power supply includes a fuel cell and the cost function further uses a rate of change in power production by the fuel cell during a reference period. For example, a fuel cell can generate power and this off-grid resource is used by the cost function to calculate an amount of electrical-power to import from a power grid during the respective time interval.

In some implementations, the computer system also stores (532) at least a portion of off-grid electrical-power supply in the rechargeable battery. For example, when electricity from a power grid (e.g., a PG&E power grid) is less expensive, due to a demand or load, electricity is imported from the power grid and stored in the rechargeable battery.

In some implementations, the computer system blackstarts an isolated power system using electrical power stored in the rechargeable battery (534). For example, electricity stored in the rechargeable battery is used to restart power generation (e.g., diesel generators) at a jail after a blackout, before power system at the jail is connected with a power grid.

In some implementations, in response to a predefined change of load from the electrical-power consumption entity, the computer system stores electrical-power into the rechargeable battery or releases electrical-power from the rechargeable battery (536). For example, if load or demand from a residential area exceeds a predefined rate of increase (e.g., after a large number of air conditioners are turned on), electricity stored in the rechargeable battery is released to meet the load or demand, when electricity from the power grid alone is not able to meet such a rapid rate of load increase.

Figure 6:
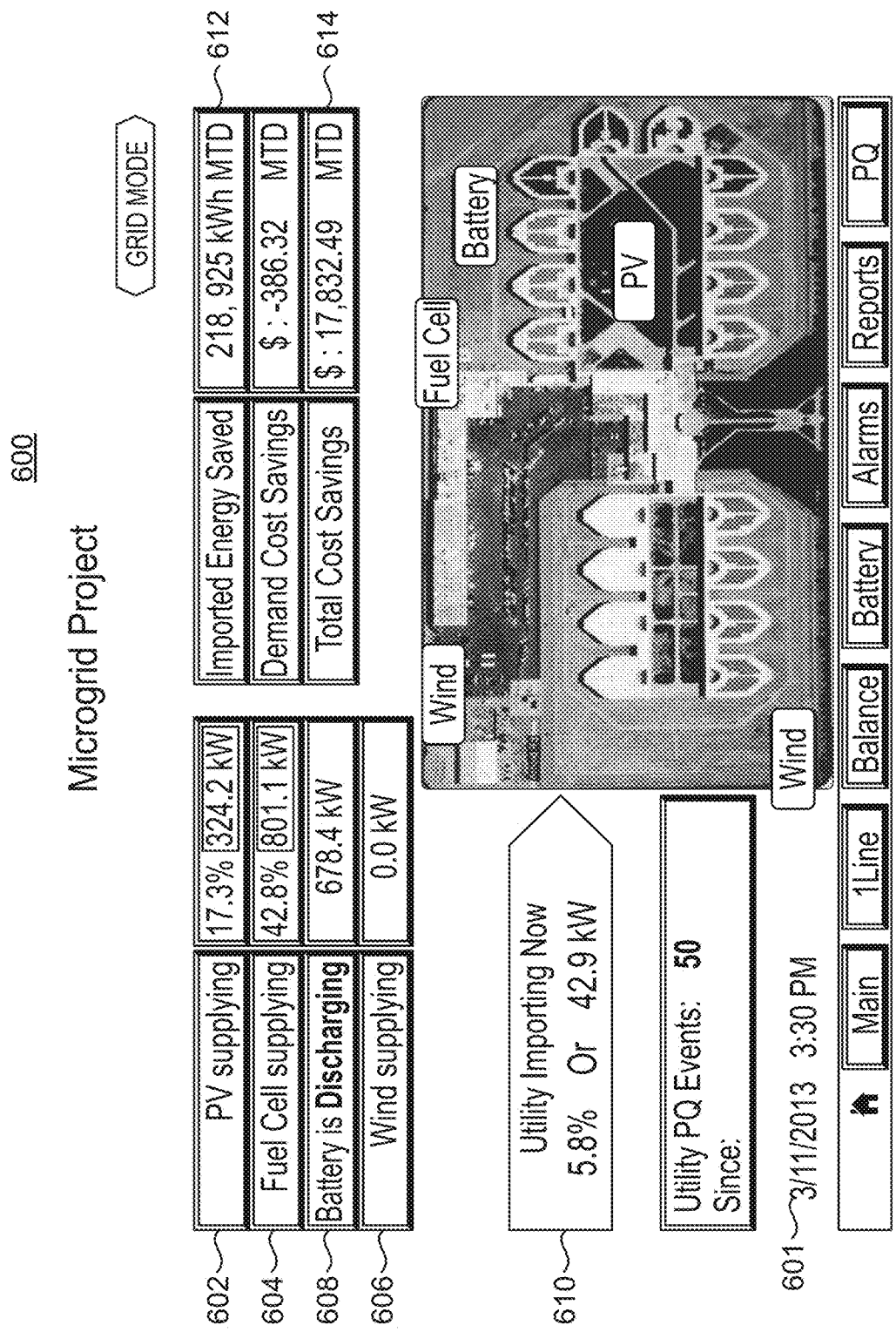
FIG. 6 is a screen image illustrating example portions of a user interface for managing an integrated power system, in accordance with some implementations.

FIG. 6 is a screen image illustrating example portions of a user interface for managing an integrated power system, in accordance with some implementations.

In FIG. 6, the search interface 600 is an example of a user interface, through which a user manages an integrated power system. For example, this is done by the user first reviewing information relating to supply from one or more off-grid power supplies. For example, in FIG. 6, a PV (photovoltaic) supply is generating 324.2 kilowatts (kWs) electricity per hour (602), a fuel cell supply is generating 801.1 kWs electricity per hour (604), and a wind supply is not generating any electricity at the movement (606) (e.g., due to a lack of windy condition).

Because the events shown in FIG. 6 were occurring at around 3:30 PM (601) (e.g., during a peak use period, when electricity is expensive to import from a power grid), a battery is discharging electricity at a rate of 678.4 kWs per hour (608), so as to meet consumption need. Because the battery is providing electricity, an amount of electricity being imported from a PG&E grid is reduced to 42.9 kWs per hour, which accounts for only 5.8% of the load.

Also shown in FIG. 6, the power management system has reduced importing electricity from the power grid in the amount of 218.925 kWh (612), and a total saving of $17,832.49 (614).

EXAMPLE IMPLEMENTATIONS

In some implementations, the computer system splits a rechargeable battery's reserved capacity to allow for multiple applications at once, e.g., dedicating a first portion of the battery for load/demand management, a second portion for grid frequency support, and a third portion for maintaining system reliability (e.g., in case of an unexpected event).

In some implementations, the computer system dispatches electricity stored in a rechargeable battery for demand response events or grid frequency support, to existing utility or grid operators. In some implementations, the DERMS calculates relative benefits of using the battery to support requests from a utility or grid operators. In some implementations, the DERMS uses its resources only for tariff.

In some implementations, Predicted Average Demand (PAD)—based on current and historical information, is the average demand the Dispatch Workstation predicts will be seen at the PCC during a particular time-of-use interval on a particular day. It factors in moving averages of the total facility load, the photovoltaic system and the fuel cell.

In some implementations, PAD=Average Facility load—Average Onsite generation Output (if operational)

In some implementations, Average Discharge Demand (ADD) is the average kW from the battery that will discharge the battery from one charge level to a lesser charge level.

Required Average Charge (RAC)—For a given interval of time and assuming a constant electrical charge rate, this is the power (kW) needed to charge the battery from a lesser value to a greater value in the time allotted. RAC will negative when the Battery is being requested to discharge and it would be equal to ADD. The battery will charge when the cost of power is the lowest daily rate. The battery will discharge when the cost of power is higher than the lowest daily rate. For time periods that the cost of power is between the minimum and the high cost, the battery will charge if in the next time period the rate will be a high cost and discharge if in the next time period the rate will be a lower cost.

Targeted PCC Load (TPL) is the load, in kW, that the Dispatch Workstation is requesting the battery controller to maintain at the PCC at any given time. If the PAD and ADD/RAC predictions are accurate, TPL is a constant value over the entire time-of-use period.

State of Charge (SOC)—The energy stored in total battery as a percentage of the total battery storage capacity. SOCf=SOC final, SOCi=SOC initial.

Battery Storage Capacity (BCAP) is the total amount of energy storage available in the battery.

Battery Inverter Rating (BRAT) is the max KW can be supplied by system. T is a time duration of a particular time-of-use period.

TOU $/KWh is the costs per KWh for each TOU define in the tariff database.

TOU $/KWh min is the identified minimum $/KWh among the TOUs defined in the tariff database.

TOU SOCstart is the targeted SOC % at the beginning of each TOU. TOU SOCend is the targeted SOC % at the end of each TOU.

Energy Tariff Ratio (R) is the ratio of the current TOU $/KWh rate to the $/KWh rate identified for charging from tariff database.

For example, during summer season, during peak time when off-peak is the identified period for charging:

$$R = \frac{\text{Summer on Peak }\$/KWh}{\text{Summer Off Peak }\$/KWh}$$

Demand Tariff Ratio (K) is the ratio of the current TOU $/KW rate to the $/KW rate identified for charging from tariff database.

For example, during winter season, during partial peak time when off-peak is the identified period for charging:

$$K = \frac{\text{Winter Part Peak }\$/KW}{\text{Winter Max Peak }\$/KW}$$

Another example, during summer season, during on-peak time when off-peak is the identified period for charging:

$$K = \frac{\text{Summer On Peak }\$/KW}{\text{Summer Max Demand }\$/KW}$$

C is Boolean Charge Factor determining whether charging is allowed during the current TOU. C=f(R, K, TOU SOC start, TOU SOC end)

D is Boolean Discharge Factor determining whether discharging is allowed during the current TOU. In some implementations, D=f(R, K, TOU SOC start, TOU SOC end).

In some implementations, C+D<=1 (C and D cannot both be equal to 1 for the same period of time).

In some implementations, PAD=f(Historic Facility Load, Historic Onsite Generation, weighted for current conditions).

In some implementations, RAC=(SOCf−SOCi)*BCAP/T*C.

In some implementations, ADD=(SOCi−SOCf)*BCAP/T*D.

In some implementations, TPL=PAD+RAC−ADD.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation (s).

It will also be understood that, although the terms "first," "second," etc. may be used herein to describe various elements, these elements should not be limited by these terms. These terms are only used to distinguish one element from another. For example, a prospective time period could be termed a second time period, and, similarly, a second time period could be termed a prospective time period, which changing the meaning of the description, so long as all occurrences of the "prospective time period" are renamed consistently and all occurrences of the "second time period" are renamed consistently. The prospective time period, and the second time period are both time periods, but they are not the same time period.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
   at a computer system having one or more processors and memory storing one or more programs executed by the one or more processors:
   calculating a load prediction arising from an electrical-power consumption entity over a prospective time period;
   calculating a predicted off-grid electrical-power supply from an off-grid electrical-power supply over the prospective time period;
   minimizing, for a respective time interval in a plurality of time intervals, a calculated amount of electrical-power to import from a power grid during the respective time interval, in accordance with output from a cost function, wherein the cost function uses:
   (i) a multi-component time of use tariff schedule associated with the power grid that includes a first power rate during a prospective time period and second power rate during a second time period, wherein the first power rate is other than the second power rate,
   (ii) the load prediction over the prospective time period,
   (iii) the predicted off-grid electrical-power supply over the prospective time period, and
   (iv) a state of a rechargeable battery, wherein the plurality of time intervals collectively accounts for the prospective time period; and
   for at least one interval in the plurality of time intervals, importing, from the power grid, the corresponding calculated amount of electrical-power corresponding to the at least one interval.

2. The method of claim 1 wherein, for a respective time interval in the plurality of time intervals, the cost function further uses an amount of off-grid electrical-power produced by the off-grid electrical-power supply during a historical time period.

3. The method of claim 1 wherein, for a respective time interval in the plurality of time intervals, the cost function further uses an integration or average of the actual load from the electrical-power consumption entity across a reference time interval.

4. The method of claim 3 wherein the reference time interval occurs on the same day as the prospective time period.

5. The method of claim 1 wherein, for a respective time interval in the plurality of time intervals, the cost function further uses an integration or average of the actual off-grid electrical-power supply generated during a reference interval.

6. The method of claim 5, wherein the reference time interval occurs on the same day as the prospective time period.

7. The method of claim 1, wherein calculating the predicted off-grid electrical-power supply from the off-grid electrical-power supply over the prospective time period uses a weather report for the prospective time period.

8. The method of claim 1, wherein the cost function provides the calculated amount of electrical-power to import from a power grid during the respective time interval as an instantaneous value across the respective time interval.

9. The method of claim 8, wherein the cost function uses instantaneous current load from the electrical-power consumption entity across the respective time interval.

10. The method of claim 1, further comprising storing at least a portion of an off-grid electrical-power supply produced by the off-grid electrical-power supply in the rechargeable battery.

11. The method of claim 1, wherein the multi-component time of use tariff schedule includes a load charge and an energy charge by the power grid, respectively, during (i) a peak-consumption time period, (ii) a partial-peak consumption time period, and (iii) an off-peak consumption time period.

12. The method of claim 1, wherein the prospective time period is between 3 and 10 days and a respective time interval in the plurality of time intervals is between 30 minutes and 6 hours.

13. The method of claim 1, wherein the off-grid electrical-power supply includes a renewable energy supply.

14. The method of claim 1, wherein the off-grid electrical-power supply is affected by, at least in part, one or more natural events that are uncontrollable by a user.

15. The method of claim 1, wherein the off-grid electrical-power supply includes power supply from one of: a photovoltaic power source, a fuel cell power source, a hydro-electric power source, a geo-thermal power source, a wind turbine, a diesel generator, and an albedo source.

16. The method of claim 1, wherein the off-grid electrical-power supply includes power supply from two or more of: a photovoltaic power source, a fuel cell power source, a hydro-electric power source, a geo-thermal power source, a wind turbine, a diesel generator, and an albedo source.

17. The method of claim 1, wherein the state of the rechargeable battery includes one of: a charge rate, a total capacity, a remaining capacity, and a type associated with the rechargeable battery.

18. The method of claim 1, wherein the off-grid electrical-power supply over the prospective time period is predicated using:
(i) availability of the off-grid electrical-power supply over the prospective time period,
(ii) stability of the off-grid electrical-power supply over the prospective time period, and
(iii) likelihood of a natural event affecting the off-grid electrical-power supply over the prospective time period.

19. The method of claim 18, wherein the off-grid electrical-power supply includes a photovoltaic apparatus and wherein the natural event is time of year or time of day.

20. The method of claim 18, wherein the off-grid electrical-power supply includes a photovoltaic apparatus and wherein the natural event is inclement weather.

21. The method of claim 18, wherein the off-grid electrical-power supply over the prospective time period is further predicated based upon an amount of energy produced by all or a component of the off-grid electrical-power supply during a historical time period.

22. The method of claim 1, wherein the off-grid electrical-power supply includes a fuel cell and wherein the cost function further uses a rate of change in power production by the fuel cell during a reference period.

23. The method of claim 1, further comprising: black-starting an isolated power system using electrical power stored in the rechargeable battery.

24. The method of claim 1, further comprising: in response to a predefined change of load from the electrical-power consumption entity, storing electrical-power into the rechargeable battery or releasing electrical-power from the rechargeable battery.

25. The method of claim 1, wherein the rechargeable battery is configured for storing more than 1 megawatt-hour of power.

26. The method of claim 1, wherein the rechargeable battery is a lithium iron phosphate battery.

27. The method of claim 1, wherein the load prediction uses a weather report for the prospective time period.

28. The method of claim 1, wherein the electrical-power consumption entity is an individual residence.

29. The method of claim 1, wherein the electrical-power consumption entity is a town, building, city, a compound, a school, a university campus, a penitentiary, or a jail.

30. The method of claim 1, wherein the multi-component time of use tariff schedule is based on a real time pricing model.

31. The method of claim 1, wherein the off-grid electrical-power supply includes one or more generators; and further comprising:
when supply exceeds load,
storing electrical power in the rechargeable battery without reducing power production from the one or more generators.

32. A computer system, comprising:
one or more processors;
memory; and
one or more programs, wherein the one or more programs are stored in the memory and configured to be executed by the one or more processors, the one or more programs including instructions for:
calculating a load prediction arising from an electrical-power consumption entity over a prospective time period;
calculating a predicted off-grid electrical-power supply from an off-grid electrical-power supply over the prospective time period;
minimizing, for a respective time interval in a plurality of time intervals, a calculated amount of electrical-power to import from a power grid during the respective time interval, in accordance with output from a cost function, wherein the cost function uses:
(i) a multi-component time of use tariff schedule associated with the power grid that includes a first power rate during a prospective time period and second power rate during a second time period, wherein the first power rate is other than the second power rate,
(ii) the load prediction over the prospective time period,
(iii) the predicted off-grid electrical-power supply over the prospective time period,
(iv) a state of a rechargeable battery, wherein the plurality of time intervals collectively accounts for the prospective time period; and
for at least one interval in the plurality of time intervals, importing, from the power grid, the corresponding calculated amount of electrical-power corresponding to the at least one interval.

33. A non-transitory computer readable storage medium storing one or more programs, the one or more programs comprising instructions, which when executed by a computer system with one or more processors, cause the computer system to:
calculate a load prediction arising from an electrical-power consumption entity over a prospective time period;

calculate a predicted off-grid electrical-power supply from an off-grid electrical-power supply over the prospective time period;

minimize, for a respective time interval in a plurality of time intervals, a calculated amount of electrical-power to import from a power grid during the respective time interval, in accordance with output from a cost function, wherein the cost function uses:
  (i) a multi-component time of use tariff schedule associated with the power grid that includes a first power rate during a prospective time period and second power rate during a second time period, wherein the first power rate is other than the second power rate,
  (ii) the load prediction over the prospective time period,
  (iii) the predicted off-grid electrical-power supply over the prospective time period,
  (iv) a state of a rechargeable battery, wherein the plurality of time intervals collectively accounts for the prospective time period; and for at least one interval in the plurality of time intervals, import, from the power grid, the corresponding calculated amount of electrical-power corresponding to the at least one interval.

* * * * *